(12) United States Patent
Lee

(10) Patent No.: US 6,373,843 B1
(45) Date of Patent: Apr. 16, 2002

(54) ATM SWITCH SYSTEM CAPABLE OF PREVENTING ATM CELLS WITH SYNCHRONIZATION LOSS FROM BEING APPLIED TO A SWITCH BLOCK THEREOF

(75) Inventor: Min Hyung Lee, Incheon (KR)

(73) Assignee: Mercury Corporation, Incheon (KR)

( * ) Notice: Subject to any disclaimer, the term of this patent is extended or adjusted under 35 U.S.C. 154(b) by 0 days.

(21) Appl. No.: 09/166,143

(22) Filed: Oct. 2, 1998

(30) Foreign Application Priority Data

Dec. 31, 1997 (KR) .............................. 97-81784

(51) Int. Cl.[7] .................................. H04J 3/24
(52) U.S. Cl. .................................... 370/395.1; 370/413
(58) Field of Search ............................. 370/395.1, 398, 370/395.2, 395.71, 412, 413, 217, 218, 225

(56) References Cited

U.S. PATENT DOCUMENTS 5,309,432 A * 5/1994 Kanakia ..................... 370/413
5,394,394 A * 2/1995 Crowther et al. ............ 370/413
5,680,425 A * 10/1997 Morzano .................... 370/413

OTHER PUBLICATIONS

Brown et al, An IRAM–based Architecture for a Single–Chip ATM Switch, Harvard University, pp. 1–32, 1997.*

* cited by examiner

Primary Examiner—Wellington Chin
Assistant Examiner—Frank Duong
(74) Attorney, Agent, or Firm—Bacon & Thomas, PLLC

(57) ABSTRACT

An asynchronous transfer mode (ATM) switch system having a switch for exchanging an ATM cell between one of the inputs thereto and one of the outputs therefrom, comprises a plurality of linking blocks, an administrating block and a processor. Each of the linking blocks is coupled with the switch and applies the ATM cell to selected one of the inputs to the switch and checks whether or not the ATM cell is synchronized with a cell synchronization signal and activates a synchronization loss (SL) signal when the ATM cell is not synchronized with the cell synchronization signal. The administrating block is coupled with each of the linking blocks for checking whether or not the SL signal for each of the linking blocks is activated for a predetermined number of successive ATM cells and for isolating a selected one of the linking blocks, at which the SL signal is activated for the predetermined number of successive ATM cells, from the switch, wherein the isolated linking block stops applying the ATM cells to the switch. And the processor is coupled with the switch and the administrating block for controlling the switch to receive the ATM cells from a substitution linking block from the remaining linking blocks when the selected linking block is isolated.

4 Claims, 3 Drawing Sheets

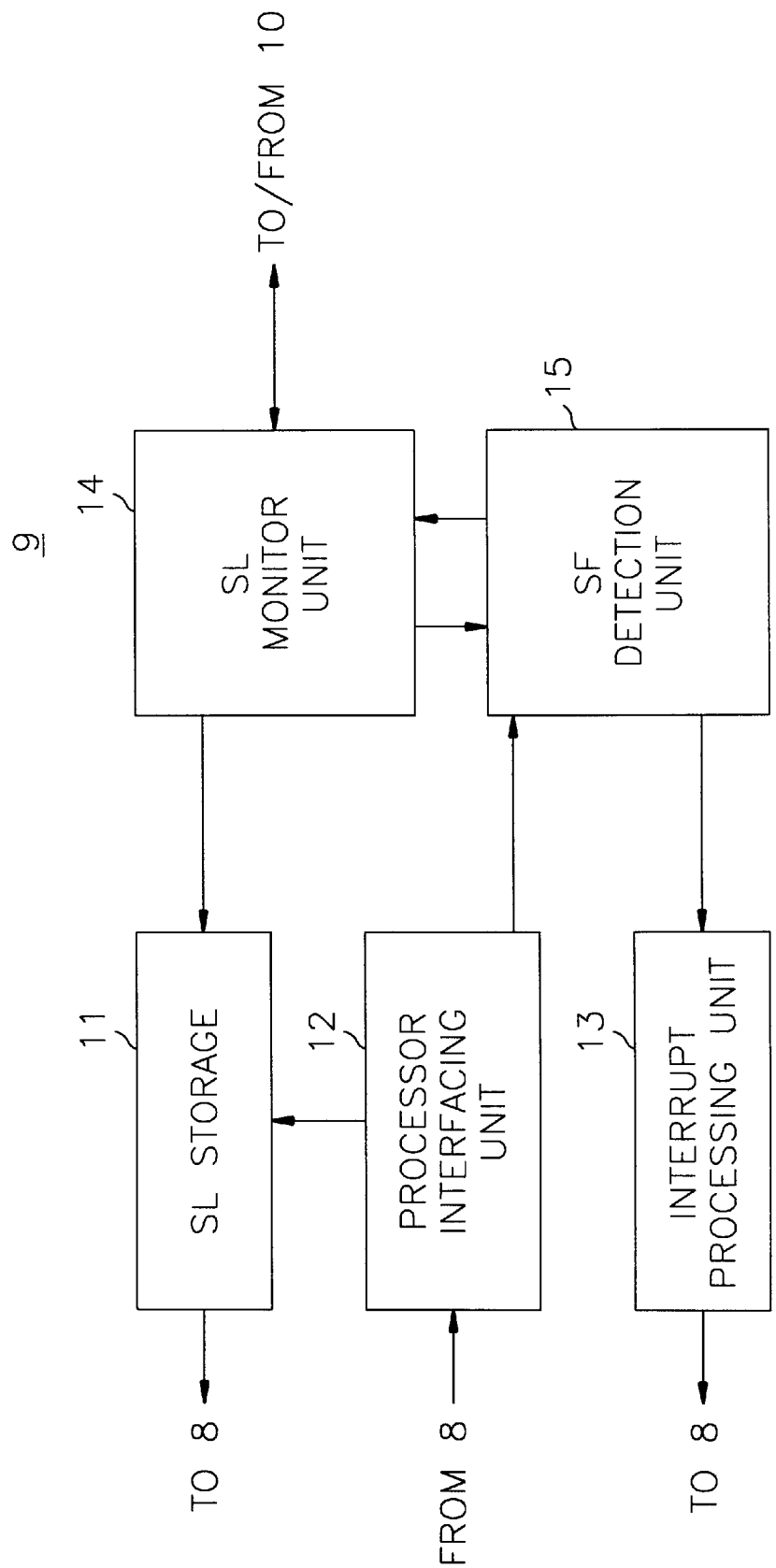

… (2) …

ATM SWITCH SYSTEM CAPABLE OF PREVENTING ATM CELLS WITH SYNCHRONIZATION LOSS FROM BEING APPLIED TO A SWITCH BLOCK THEREOF

FIELD OF THE INVENTION

The present invention relates to an asynchronous transfer mode (ATM) system; and, more particularly, to an ATM switch system capable of preventing ATM cells with synchronization loss from being applied to a switch block thereof.

BACKGROUND OF THE INVENTION

An asynchronous transfer mode (ATM) switch system constructs an ATM node for connecting an ATM network to another ATM network or connecting ATM subscribers to the ATM network. The ATM switch system handles information divided into ATM cells having a fixed length and being transferred asynchronously in an ATM network. Referring to FIG. 1, a conventional ATM switch system 1 comprises a switch block 2, a processor block 3 and a plurality of link blocks, e.g., blocks 4 and 5 shown in FIG. 1.

The switch block 2 exchanges the ATM cells between two link blocks 4 and 5.

Each of the link blocks 4 and 5 performs serial/parallel conversion to transfer ATM cells between the switch block 2 and a subscriber access block (not shown) or a trunk access block (not shown). Each of the link blocks 4 and 5 receives the ATM cells serially from the access block (not shown), each cell having a predetermined length. And each of the link blocks 4 and 5 applies the received ATM cells parallel, e.g., with 4-bit data width (nibble-by-nibble), to the switch block 2 and a cell synchronization signal, e.g., a nibble cell synchronization (NCS) signal, activated during a first nibble transfer of each ATM cell.

Each of the link blocks 4 and 5 monitors cell synchronization and applies a synchronization loss (SL) signal to the processor block 3. That is, each of the link blocks 4 and 5 checks whether or not the ATM cell applied thereto is synchronized with the NCS signal and activates the SL signal when the ATM cell is not synchronized with the NCS signal. For example, if one of the link blocks 4 and 5 is not connected physically to the subscriber access block/trunk access block (not shown), or is not synchronized with the access block/trunk access block (not shown), or has a heavy fault therein, said one of the link blocks 4 and 5 activates the corresponding SL signal.

The processor block 3 checks periodically, e.g., at every 1 millisecond, the status of the SL signal applied from each of the link blocks 4 and 5. When the processor block 3 detects the activation of the SL signal from said one of the link blocks 4 and 5, the processor block 3 applies an isolation control signal to the switch block 2. The switch block 2 applies an isolation signal to said one of the link blocks 4 and 5 to isolate it from the switch block 2. And also, the switch block 2 controls a substitution block of the link blocks 4 and 5 to succeed said one of the link blocks 4 and 5.

When the switch block 2 applies the isolation signal to said one of the link blocks 4 and 5, the latter stops transferring the ATM cell to the switch block 2.

However, said one of the link blocks 4 and 5 is not isolated immediately because the processor block 3 performs status checking periodically and performs isolation via the switch block 2. Therefore, a number of the ATM cells with the synchronization loss are transferred to the switch block 2 before the corresponding block is isolated from the switch block 2.

SUMMARY OF THE INVENTION

It is, therefore, a primary object of the present invention to provide an ATM system capable of preventing ATM cells with synchronization loss from being applied to a switch block thereof.

In accordance with the present invention, there is provided an ATM switch system having a switch for exchanging an ATM cell between one of the inputs thereto and one of the outputs therefrom, comprising:

a plurality of linking blocks, each block coupled with the switch for applying the ATM cell to a selected one of the inputs to the switch, wherein each of the linking blocks checks whether or not the ATM cell is synchronized with a cell synchronization signal and activates a synchronization loss (SL) signal when the ATM cell is not synchronized with the cell synchronization signal;

an administrating block coupled with each of the linking blocks for checking whether or not the SL signal for each of the linking blocks is activated for a predetermined number of successive ATM cells and for isolating a selected one of the linking blocks, at which the SL signal is activated for the predetermined number of successive ATM cells, from the switch, wherein the isolated selected linking block stops applying the ATM cells to the switch; and a processor coupled with the switch and the administrating block for controlling the switch to receive the ATM cell from a substitution block from the remaining linking blocks when the selected linking block is isolated.

BRIEF DESCRIPTION OF THE DRAWINGS

The above and other objects and features of the present invention will become apparent from the following description of preferred embodiments given in conjunction with the accompanying drawings, in which:

FIG. 3 represents a detailed block diagram of the link A&M block in FIG. 2.

DETAILED DESCRIPTION OF THE PREFERRED EMBODIMENTS

Figure 1:
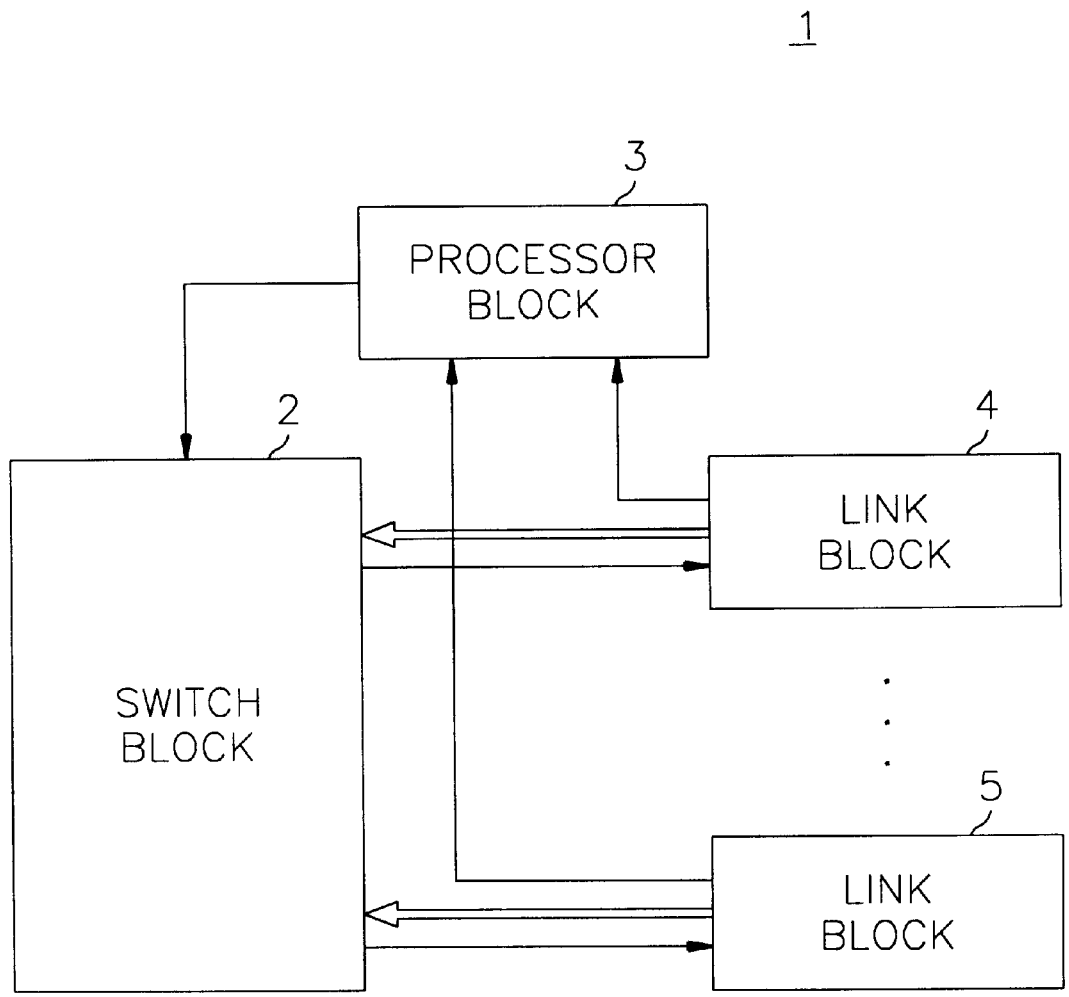
FIG. 1 presents a block diagram of a conventional ATM switch system.
Figure 2:
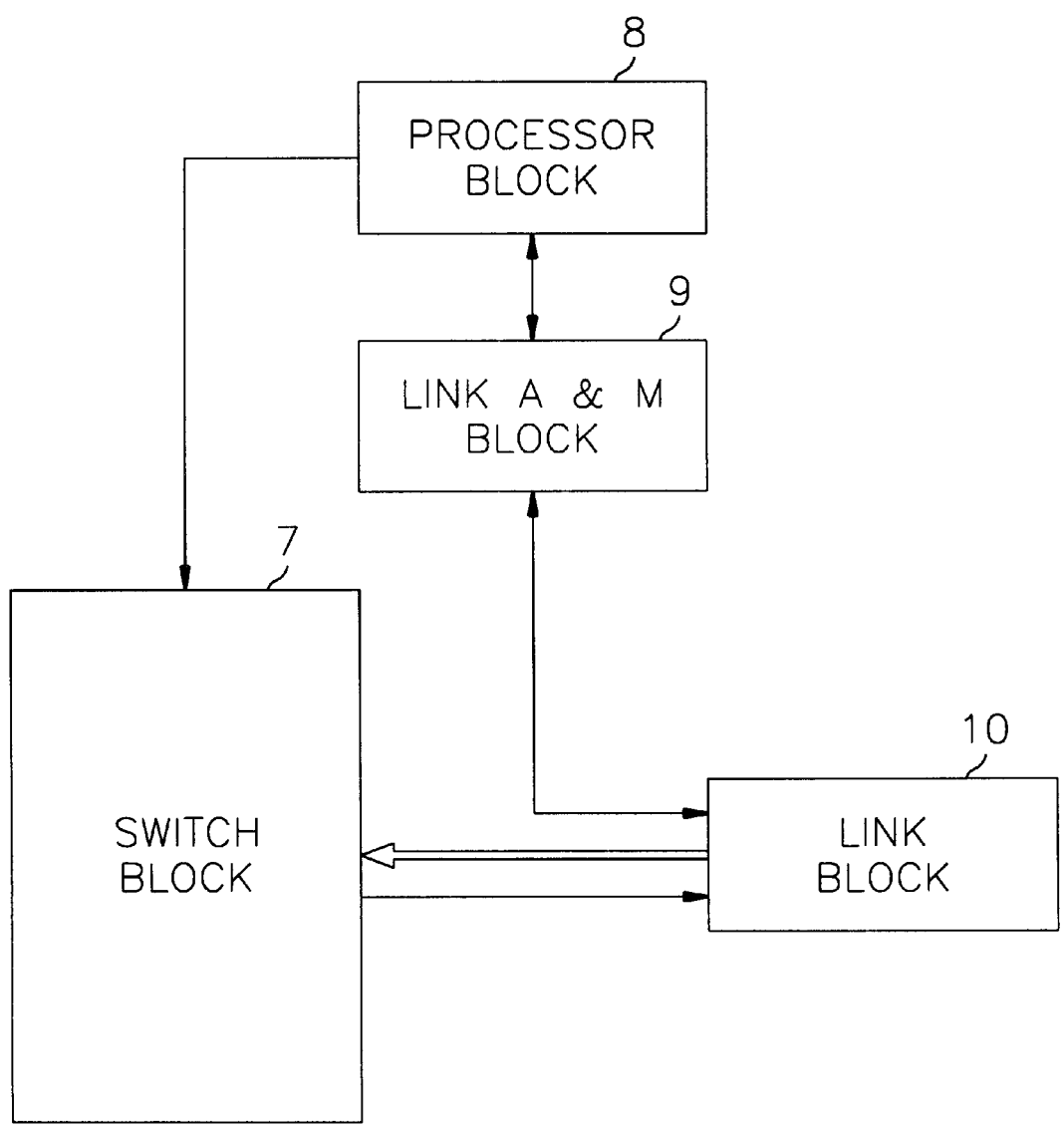
FIG. 2 provides a block diagram of an ATM switch system in accordance with the present invention.

Referring to FIG. 2, there is provided a block diagram of an inventive asynchronous transfer mode (ATM) switch system 6 which comprises a switch block 7, a processor block 8, a link administration and maintenance (A&M) block 9, and a plurality of link blocks 10. For the sake of simplicity, in FIG. 2, it is offered only one link block 10.

The switch block 7 exchanges ATM cells between the link block 10 and another link block (not shown).

The link block 10 performs serial/parallel conversion to transfer ATM cells between the switch block 7 and a subscriber access block or a trunk access block (not shown). The link block 10 receives the ATM cells serially from the subscriber access block or the trunk access block (not shown), each cell having a predetermined length. And the link block 10 applies the received ATM cells parallel, e.g., with 4-bit data width (nibble-by-nibble), to the switch block 7 and a cell synchronization signal, e.g., a nibble cell synchronization (NCS) signal activated during a first nibble transfer of each ATM cell.

The link block 10 monitors cell synchronization for each ATM cell and applies a synchronization loss (SL) signal to the link A&M block 9. That is, the link block 10 checks whether or not the ATM cell applied thereto is synchronized with the NCS signal and activates the SL signal when the ATM cell is not synchronized with the NCS signal.

For example, if the link block 10 is not connected physically to the subscriber access block/trunk access block (not shown), is not synchronized with the access block/trunk access block (not shown), or has a heavy fault therein, the link block 10 activates the SL signal.

The link A&M block 9 monitors the SL signal from the link block 10. And the link A&M block 9 applies a disconnect signal to the link block 10 to isolate the link block from the switch block 7 and an interrupt signal to the processor block 8 when the link A&M block 9 detects that the SL signal is activated.

When the link block 10 receives the disconnect signal, it stops transferring the ATM cells to the switch block 7. When the processor block 8 receives the interrupt signal, it checks the status of the link block 10 through the link A&M block 9 and applies an isolation control signal to the switch block 7. Once receiving the isolation signal from the processor block 8, the switch block 7 isolates the block 10. And also, the switch block 2 controls a substitutional link block (not shown) to succeed the link block 10.

Referring to FIG. 3, there is provided a detailed block diagram of the link A&M block 9 which includes a SL storage 11, a processor interfacing unit 12, an interrupt processing unit 13, a SL monitor unit 14 and a synchronization failure (SF) detection unit 15.

The SL storage 11 is coupled to the SL monitor unit 14 to register SL information including status of the SL signal of the link block 10. And the SL storage 11 is coupled to the processor block 8 which reads the SL information.

The processing interfacing unit 12 is coupled to the processor block 8 to receive control signals such as a read signal and an address and to the SL storage 11 to apply a read enable signal so that the SL information at the SL storage 11 is read by the processor block 8. The processing interfacing unit 12 is also coupled to the SF detection unit 15 to apply a SF reset signal to the SF detection unit 15 when the SL information is read by the processor block 8.

The interrupt processing unit 13 is coupled to the processor block 8 to apply an interrupt signal.

The SL monitor unit 14 is coupled to the link block 10 to receive the SL signal therefrom and apply the disconnect signal thereto. The SL monitor unit 14 transfers the SL information to the SL storage 11. And the SL monitor unit 14 is coupled to the SF detection unit 15 to apply a SL detect signal when the activated SL signal is received.

The SF detection unit 15 checks whether or not the SL detect signal is applied a predetermined number of times, e.g, 8 times, successively. The SF detection unit 15 applies a synchronization failure (SF) signal and an interrupt source signal to the SL monitor unit 14 and the interrupt processing unit 13, respectively, when the SF detection unit 15 receives the SL signal successively for 8 ATM cells.

Hereinafter, the operation of the link A&M block 9 will be described in conjunction with FIGS. 2 and 3.

The SL monitor unit 14 receives the SL signal from the link block 10. The SL monitor unit 14 checks, at every activation of the NCS signal, i.e., at every ATM cell transfer, if the SL signal is activated. The SL monitor unit 14 transfers the SL information, depicting that the SL signal is activated or not for each of the ATM cells, to the SL storage 11. The SL monitor unit 14 applies the SL detect signal to the SF detection unit 15 when the activated SL signal is received by the SL monitor unit 14.

The SF detection unit 15 checks whether or not the SL detect signal is received thereby successively for 8 ATM cells. When the SL detect signal is received by the SF detection unit 15 successively for 8 ATM cells, the SF detection unit 15 applies the SF signal and the interrupt source signal to the SL monitor unit 14 and the interrupt processing unit 13, respectively.

Receiving the SF signal, the SL monitor unit 14 applies the disconnect signal to the link block 10 to prevent the ATM cells with the synchronization loss from being applied to the switch block 7. The link block 10 stops transferring the ATM cells to the switch block 7 therefrom.

Receiving the interrupt source signal, the interrupt processing unit 13 applies the interrupt signal to the processor block 8. The processor block 8 sends the read signal and the address signal to the processing interfacing unit 12 to read the SL information from the SL storage 11.

The processor interfacing unit 12 applies the read enable signal to the SL storage 11 and then the processor block 8 read the SL information registered at the SL storage 11.

The processor block 8 applies the isolation control signal to the switch block 7. The switch block 7 applies the isolation signal to the link block 10 and a succession control signal to the substitutional link block (not shown) of the link block 10. The substitutional link block (not shown) starts transferring the ATM cells instead of the link block 10.

While the present invention has been shown and described with respect to the particular embodiments, it will be apparent to those skilled in the art that many changes and modifications may be made without departing from the spirit and scope of the invention as defined in the appended claims.

What is claimed is:

1. An asynchronous transfer mode (ATM) switch system having a switch for exchanging an ATM cell between one of the inputs thereto and one of the outputs therefrom, comprising:

a plurality of linking means, each linking means coupled with the switch for applying the ATM cell to a selected one of the inputs to the switch, wherein each of the linking means checks whether or not the ATM cell is synchronized with a cell synchronization signal and activates a synchronization loss (SL) signal when the ATM cell is not synchronized with the cell synchronization signal;

administrating means, coupled with each of the linking means, for checking whether or not the SL signal for each of the linking means is activated for a predetermined number of successive ATM cells and for isolating a selected one of the linking means, at which the SL signal is activated for the predetermined number of successive ATM cells, from the switch, wherein the isolated selected linking means stops applying the ATM cells to the switch; and processing means, coupled with the switch and the administrating means, for controlling the switch to receive the ATM cells from a substitution linking means from the remaining linking means when the selected linking means is isolated.

2. The ATM switch system of claim 1, wherein the administrating means includes:

monitoring means for receiving the SL signal from each of the linking means to detect the activation of the SL signal; and detecting means, coupled with the monitoring means, for checking the number of successive activations of the SL signal for each of the linking means to generate a synchronization failure signal for the selected linking means when the number of the successive activation of the SL signal for the selected linking means is the predetermined number, wherein the monitoring means controls the selected linking means to stop applying the ATM cells to the switch.

3. The ATM switch system of claim 2, wherein the administrating means further includes:

storing means, coupled with the monitoring means, for registering SL information which represents the number of the successive activations of the SL signal for each of the linking means;

interrupting means, coupled with the detecting means, for applying an interrupt signal to the processing means when the number of the successive activations of the SL signal for the selected linking means is the predetermined number; and interfacing means for receiving from the processing means a read signal and an address for the storing means and applying a read enable signal to thereby transfer the SL information from the storing means to the processing means.

4. The ATM switch system of claim 1, wherein the predetermined number is 8.

* * * * *